United States Patent [19]

Matsunaga et al.

[11] 4,045,204
[45] Aug. 30, 1977

[54] FERTILIZER COMPOSITION

[75] Inventors: Hiroomi Matsunaga, Kobe; Sigel Fujimura, Nishinomiya; Hisao Namioka, Niihama; Kozo Tsuji; Masashi Watanabe, both of Ibaragi, all of Japan

[73] Assignees: Sumitomo Chemical Company, Limited, Osaka; Hayashibara Biochemical Laboratories, Inc., both of Japan

[21] Appl. No.: 660,871

[22] Filed: Feb. 24, 1976

[30] Foreign Application Priority Data

Feb. 24, 1975 Japan .................................. 50-23310
Feb. 24, 1975 Japan .................................. 50-23311

[51] Int. Cl.$^2$ .............................................. C05F 11/08
[52] U.S. Cl. .............................................. 71/11; 71/24; 71/27; 71/63; 71/64 G
[58] Field of Search .................... 71/1, 11, 24, 27, 63, 71/64 G

[56] References Cited

U.S. PATENT DOCUMENTS 3,502,458   3/1970   Schenk .............................. 71/24 X

FOREIGN PATENT DOCUMENTS 51-1372   1/1976   Japan

OTHER PUBLICATIONS

Chem. Abstr., vol. 85, 1976, No. 34068y, Matsunaga et al.

*Primary Examiner*—Frank A. Spear, Jr.
*Assistant Examiner*—Ferris H. Lander
*Attorney, Agent, or Firm*—Stevens, Davis, Miller & Mosher

[57] ABSTRACT

A fertilizer composition manufactured by mixing a fertilizer or a fertilizing substance with pullulan or a derivative thereof, used as binder, and solidifying the mixture. The composition is easily shapable. Another advantage of pullulan over conventional binders is that the pullulan or its derivative which remains in the soil after application of the composition and dissolution of the fertilizer component is degraded by the action of water and soil microorganisms in the soil and, hence, will not hinder the growth of plants.

34 Claims, No Drawings

FERTILIZER COMPOSITION

This invention relates to a fertilizer composition excellent in shapability and mechanical strength, comprising a fertilizer or a fertilizing substance and pullulan or a derivative thereof. More particularly, it relates to a fertilizer composition, particularly a fertilizer pile, manufactured by mixing a fertilizer or a fertilizing substance with pullulan or a derivative thereof and, if necessary, an inorganic filler and solidifying the resulting mixture.

It has been proposed, heretofore, to use as a binder for fertilizers various thermoplastic or thermosetting resins, e.g., paraffin, pitch and a calcium nitrate. These materials, however, are insufficient in binding strength and not so good in shapability. There have also been known fertilizer piles prepared by forming rods from fertilizers either as such or after mixing with thermoplastic or thermosetting resins, or further covering the rod surface with synthetic resin film or waterproof paper adhered thereon. These piles or rods are also unsatisfactory in mechanical strength and, moreover, liable to become fragile owing to their high hygroscopicity so that they are unsuitable to be driven and placed down deeply into the soil; moreover, the synethetic film or waterproof paper used to cover the rod remains in the soil for a long period of time after dissolution of the fertilzer, thus interfering with the growth of plants.

The present inventors carried out a great number of experiments to overcome the above-noted difficulties and, as a result, found that it is possible to manufacture a fertilizer composition in gramular or any other form by mixing a fertilizer with pullulan or a derivative thereof and then shaping and solidifying the resulting mixture by customary shaping techniques at atmospheric or superatmospheric pressures. Based on this finding, the present invention has been accomplished.

An object of the present invention is to provide a fertilizer composition composed of fertilizer or a fertilizing substance, pullulan or a derivative thereof and in addition inorganic fillers if necessary, which is excellent in shapability and strength and maintains fertilizing effectiveness for a long period of time after the application of the fertilizer.

Another object of the present invention is to provide a fertilizer pile composed of the above-mentioned composition and a process for producing the same.

Other objects and advantages of the present invention will be apparent from the following descriptions.

When pullulan or a derivative thereof is used according to this invention in manufacturing a molded fertilizer composition by, for example, customary compression molding, the molding operation becomes very easy, because the pullulan can be easily plasticized with a suitable plasticizer such as water. After application of the resulting composition to the soil, the pullulan or its derivative in the composition remaining in the soil after dissolution of the fertilizer is degraded by the action of water and soil microorganisms in the soil and, hence, will not hinder the growth of plants. This is an advantage of the present composition over conventional ones.

The solid fertilizer composition according to the present invention has satisfactory mechanical strengths. Further the rate of release of fertilizer element from the composition may be controlled by adjusting the amount of the pullulan and, if necessary, the inorganic filler incorporated in the fertilizer composition, and further by using the pullulan derivative having suitable water-solubility. Such a controlled-release fertilizer composition is useful in enhancing the effect of fertilization as well as in saving labor necessary for fertilization. The present composition can be easily shaped into a form which is easily applicable into the soil beneath the ground surface. The composition in such a form is particularly beneficial for phosphate fertilizer which tends to be fixed near the ground surface when applied superficially as in customary practice.

The present molded fertilizer composition may be manufactured by any shaping method; the customary granulation technique, customary compression molding technique or customary extrusion molding technique may be conveniently used.

The fertilizers to be used in the present composition include ordinary single-nutrient fertilizers, mixed or compound fertilizers, organic or inorganic fertilizing substances, and mixtures thereof. Examples of the fertilizing substances, as herein referred to, include oil meals, peat moss, and compost. The present composition may contain other agricultural chemicals such as soil conditioner, pesticides, plant hormones, etc.

The pullulan, herein referred to, is a linear high polymer of the following formula, in which recurring units of maltotriose, a trimer of glucose, are linked through α-1,6 linkages which are different from the linkages through which glucose units are linked to form said trimer.

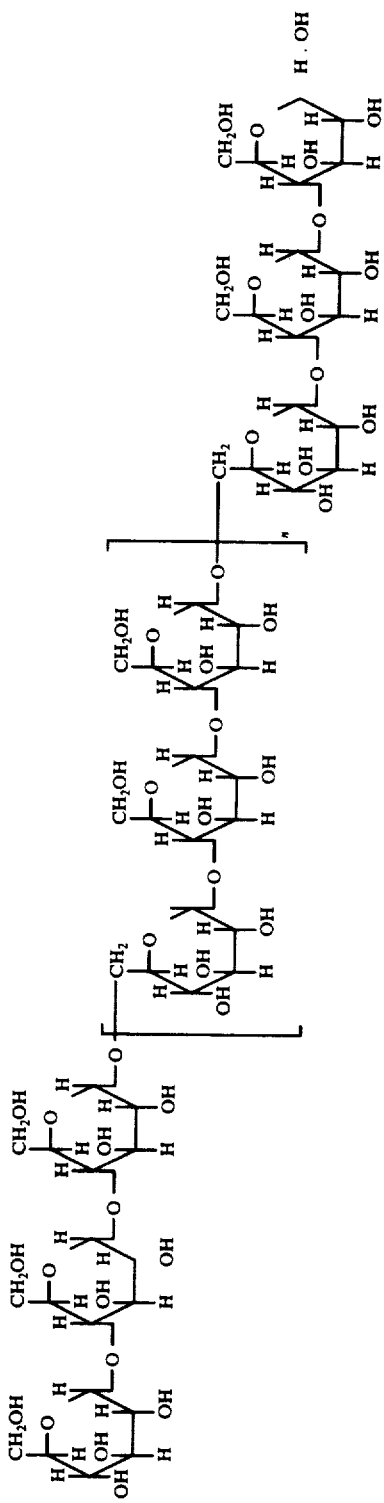

In the above formula, $n$ is an integer of 20 to 10,000 which represents the polymerization degree.

Pullulan is easily soluble in cold water. It is known that pullulan can be modified by etherification, esterification, graft polymerization with vinyl compounds such as vinyl chloride and the resulting modified pullulan is imparted with varied solubilities depending upon the degree of modification. The pullulan and derivatives thereof, as herein referred to, include these modified pullulans.

The pullulan for use in this invention may be obtained optionally by any process. It is conveniently isolated and recovered as an extracellular tacky substance from the culture liquor of a strain belonging to the genus Pullularia, which is an incomplete microorganism. For example, it is produced as an extracellular tacky substance by inoculating a strain of *Pullularia pullulans* into a culture medium containing 10% of starch syrup or glucose, 0.5% of $K_2HPO_4$, 0.1% of NaCl, 0.02% of $MgSO_4.7H_2O$, 0.06% of $(NH_4)_2SO_4$, and 0.04% of yeast extract and culturing with shaking at 24° C for 5 days. If necessary, purified pullulan is obtained from the fermentation broth by removing the cells by centrifugation, precipitating pullulan by adding methanol, and separating the precipitate. Pullulan varies somewhat in physical properties depending upon the kind of strain used. In the present invention, however, pullulan prepared by use of any strain may successfully be used. The molecular weight of the pullulan used in this invention is not particularly limited, but is desirably from 10,000 to 5,000,000, more preferably from 10,000 to 1,000,000.

The suitable amount to be added of pullulan or a derivative thereof is 0.01 to 50 parts by weight for 100 parts by weight of the fertilizer or fertilizing substance. Further, the preferred amount to be added of pullulan or a derivative thereof, if desired, for a solid fertilizer composition having an improved mechanical properties, is from 5 to 50 parts by weight for 100 parts by weight of the fertilizer or fertilizing substance. The addition of more than 50 parts by weight of pullulan or a derivative thereof has no significant effect on the improvement of mechanical properties of the molded composition or duration of the fertilization effect, thus resulting in mere increase in cost. The present fertilizer composition, if necessary, may contain a suitable water-soluble material. Suitable water-soluble materials are starch,, dextrin, gum arabic, gelatin, casein, glue, methylcellulose, carboxymethylcellulose, hydroxyalkylcellulose, alginic acid, polyvinylalcohol, polyacrylic acid, polyacrylamid, and a modified form thereof substituted partially by hydrophobic radicals in place of hydrophilic radicals. Among these water-soluble materials, starch, dextrin, gum arabic, gelatin, casein, glue, methylcellulose, carboxymethylcellulose and hydroxyalkylcellulose are preferred. The additional incorporation of said water-soluble material is optional and the amount to be added is not limited, but is usually up to 50 parts by weight for 100 parts by weight of the fertilizer or fertilizing substance.

Further, the present composition, if necessary, may contain a suitable plasticizer. Suitable plasticizers are water, polyhydric alcohols such as glycerol, ethylene glycol, and propylene glycol; amides such as formamide and dimethylformamide; amines such as diethylenetriamine, triethylenetetramine, ethanolamines, and propylmonoethanolamine; and dimethyl sulfoxide. These plasticizers are used each alone or in mixtures of two or more. The preferred plasticizer is water. The maximum amount of the plasticizer to be added is 30 parts by weight for 100 parts by weight of the fertilizer or fertilizing substance.

Inorganic fillers, if necessary, may be added to the present composition to improve mechanical properties. The fillers to be used can be customary ones such as, for example, calcium carbonate, calcium sulfite, calcium sulfate, aluminum hydroxide, talc, and clay. These fillers are used each alone or as mixtures of two or more. The average particle diameter is desirably 50 $\mu$ or less, more desirably 5 $\mu$ or less. A sufficient amount to be added of the inorganic filler is 1 to 40 parts by weight for 100 parts by weight of the fertilizer or a fertilizing substance. Addition of an excessive amount of fillers is undesirable, because it will decrease the mechanical strength of the fertilizer composition.

Pullulan or a derivative thereof, which characterizes the present composition, serves as a binder in shaping the fertilizer composition into various forms and as a plasticizer for the fertilizer to improve shapability of the composition. Since pullulan or a derivative thereof is able to control the release of fertilizer elements, it is useful for the purpose of improving the effect of fertilization, preventing the damage of plants due to excessive fertilization, and saving the labor of fertilization. Moreover, pullulan has an advantage in that since pullulan is degradable in the soil by the action of water and soil microorganisms, it has no adverse effect on the growth of plants.

For the purpose of illustrating the invention, a method for making a fertilizer pile made from the present fertilizer composition is described below in detail.

By using an extruder such as one usually used in processing synthetic resins, a uniform mixture of a fertilizer, pullulan or a derivative thereof, water and, if necessary, an inorganic filler, is heated at a temperature higher than that at which pullulan becomes plastic but lower than the decomposition temperature of the fertilizer, generally from 30° to 150° C, preferably from 40° to 120° C and extruded through the die to obtain a pile having a diameter of, for example, 2 to 50 mm. The operation is easy and high in productivity. The length of the fertilizer pile is selected depending on the kind of plants to be grown, usually from 2 to 50 cm by cutting the extruded rod of fertilizer composition.

The present fertilizer composition can be applied in the form of a ball or sliced piece into a hole drilled in the soil, or in the form of sheet to a seed bed. In applying the fertilizer pile, there is no need to dig a hole for the application of fertilizer. The pile is simply driven into the soil at the intended spot.

Application of fertilizer in the form of a pile has the following advantages: There is very little fear of cutting the root, as is the case when digging a hole for the application of fertilizer; application is done efficiently and economically; leaching of the fertilizer is prevented, resulting in increase in the effect of fertilization. One of the characteristic features of the present composition is slow release of the fertilizer elements which permits application of a large amount of fertilizer at a time, resulting in laborsaving and sustained effect of fertilization on various crops, fruit-trees, and forest trees. The pullulan or a derivative thereof and the inorganic filler contained in the present pile contribute to physico-chemical improvement of the soil and the hole remaining after exhaustion of fertilizer elements serves as a duct to feed air and water to the soil, thus providing favorable conditions for the growth of plants.

The present fertilizer composition may be incorporated with a small amount of surface active agent to improve shapability of the composition and appearance of the fertilizer pile.

The invention is illustrated below in further detail with reference to Examples, but the invention is not limited to the Examples.

EXAMPLE 1

To a weighed portion of 400 g of a compound fertilizer ("Daikokujirushi" compound fertilizer produced by Sumitomo Chemical Co.; N = 14%, $P_2O_5$ = 8%, $K_2O$ = 12%), used as the fertilizer component, were added 40 g of a binder shown in Table 1 and 4 g of water. The resulting mixture is fed to a Henschel mixer to blend thoroughly the said three components, then transferred into a cylindrical mold, 30 mm in diameter and 15 mm in length, and subjected to hot pressing for 10 minutes, at 80° C, under a pressure of 100 kg/cm². Thereafter, the molded product was removed from the mold to obtain a molded fertilizer composition in the form of a round slice, 28 mm in diameter and 14 mm in length, the test result of which were as shown in Table 1.

Table 1

| Run No. | Binder | Shapability** | Strength of molded product*** | Remark |
|---|---|---|---|---|
| 1 | Pullulan | Good | Good | This invention |
| 2 | Pullulan acetate* | Good | Good | This invention |
| 3 | Starch | Inferior | Inferior | Comparative Example |
| 4 | Polyvinyl alcohol | Good | Inferior in some degree | Comparative Example |

Note:
*Degree of substitution of hydroxyl group: DS = 1
**The shapability was evaluated from the behavior of the molded product at the time of releasing from the mold.
***The strength of the molded product was evaluated by inspecting the extent of rupture when the molded product was dropped from a height of 1.5 m.

EXAMPLE 2

The results on the fertilizer pile made by using the same compound fertilizer as in Example 1 were as shown in Table 2.

A fertilizer pile was manufactured from the fertilizer, a water-soluble substance, and water by use of an extruder (L/D = 20, compression ratio (C.R) = 1.8, inner diameter of die orifice = 30 mm). The ratio of fertilizer/water-soluble polymer/water was 80/17/3 by weight (cf. Table 2). Extrusion was carried out at a die temperature of 75° C. The results obtained were as shown in Table 2.

Table 2

| Run No. | Ingredient | | | Temperature of die, °C | Compressive strength kg/cm² | Release of component, % | | |
|---|---|---|---|---|---|---|---|---|
| | Water-soluble polymer | Inorganic filler | Water | | | After 1 months | After 3 months | After 6 months |
| 1 Comparative Example 1 | Pullulan | None | Added | 75 | 35.2 | 25.6 | 49.0 | 81.5 |
| 2 | None | None | Added | 75 | 10.5 | 100 | — | — |
| | Polyvinyl alcohol | " | " | " | 21.0 | 28.6 | 53.6 | 86.3 |
| 3 | Starch | " | " | " | 11.0 | 41.0 | 61.2 | 90.6 |
| 4 | Polyacrylic acid | " | " | " | 26.5 | 31.0 | 54.6 | 88.6 |

The results shown in Table 2 were obtained by tests carried out in the following way:

Compressive strength: Measured on the fertilizer pile cut to a length of 6 cm, by means of a compressive strength testing machine for construction materials.

Percentage release of component: The fertilizer pile was incubated at 30° C in the soil containing water corresponding to 60% of the maximum water content and the amount of nitrogen released was measured at predetermined time intervals. The percentage release of component was expressed in terms of the ratio in percent of the leached amount of nitrogen to the total nitrogen in the original pile.

EXAMPLE 3

In Table 3 are shown the test results on the fertilizer pile made by using the same compound fertilizer as in Example 1.

A fertilizer pile was manufactured from the said fertilizer, a water-soluble polymer, an inorganic filler, and water by use of an extruder (L/D = 20 , C.R. = 1.8, inner diameter of die orifice = 30 mm). The ratio of fertilizer/water-soluble polymer/inorganic filler/water was 70/10/15/5 by weight of (cf. Table 3). Extrusion was carried out at a die temperature of 80° C. The results obtained were as shown in Table 3. The tests for compressive strength of the fertilizer pile and percentage release of the component were carried out in the same manner as in Example 2.

What is claimed is:

1. A fertilizer composition comprising a fertilizer or a fertilizing substance and pullulane or a derivative thereof.

2. The fertilizer composition of claim 1, wherein the derivative of pullulan is an etherized pullulan, an esterified pullulan or a pullulan-vinyl monomer graft polymer.

3. The fertilizer composition of claim 1, wherein the molecular weight of the pullulan is 10,000 to 5,000,000.

4. The fertilizer composition of claim 1, wherein the fertilizing substance is oil meals, peat moss or compost.

5. The fertilizer composition of claim 1, wherein the amount of pullulan or derivative thereof is 0.01 to 50 parts by weight for 100 parts by weight of fertilizer or fertilizing substance.

6. The fertilizer composition of claim 1, wherein as an inorganic filler at least one member selected from the group consisting of calcium carbonate, calcium sulfite, calcium sulfate, aluminum hydroxide, talc and clay is added.

7. The fertilizer composition of claim 6, wherein the amount of the inorganic filler is 1 to 40 parts by weight for 100 parts by weight of the fertilizer or fertilizing substance.

8. The fertilizer composition of claim 6, wherein the average particle diameter of the inorganic filler is 50 microns or less.

9. The fertilizer composition of claim 1, wherein as a

Table 3

| Run No. | Ingredient | | | Temperature of die, °C. | Compressive strength kg/cm$^2$ | Release of component, % | | |
|---|---|---|---|---|---|---|---|---|
| | Water-soluble polymer | Inorganic filler | Water | | | After 1 months | After 3 months | After 6 months |
| 1 | Pullulan | Calcium sulfate | Added | 80 | 40.2 | 18.2 | 43.0 | 70.2 |
| Comparative Example 1 | None | None | " | " | 8.0 | 100 | — | — |
| 2 | Polyvinyl alcohol | Calcium sulfate | " | " | 25.6 | 20.3 | 46.0 | 76.2 |
| 3 | Starch | " | " | " | 12.0 | 35.0 | 56.2 | 82.0 |
| 4 | Polyacrylic acid | " | " | " | 32.8 | 28.6 | 49.6 | 78.0 |

As is apparent from Tables 2 and 3, in cases where the fertilizer pile was manufactured from the fertilizer alone or by use of water-soluble polymers other than pullulan, the pile was inferior in compressive strength and the release of fertilizer element was very rapid. To the contrary, the fertilizer pile manufactured according to this invention was markedly superior in compressive strength and showed an adequately controlled rate of release of the fertilizer element.

As mentioned in the foregoing, the fertilizer pile according to this invention can be manufactured without necessitating the use of a fertilizer container, has sufficient mechanical strength for deep placement of fertilizer, and permits controlled release of the nutrient. A further advantage of the present fertilizer pile is that there can easily be incorporated therewith those fertilizer salts which were with difficulty incorporated into a pile by conventional techniques, and other ingredients than fertilizer such as, for example, trace elements, plant hormones, agricultural chemicals, and soil conditioners can also be included. The present fertilizer pile can be further improved in commercial value by coating the surface with colored paraffin wax or thermoplastic resins.

plasticizer at least one member selected from the group consisting of water, glycerol, ethylene glycol, propylene glycol, formamide, dimethyl formamide, diethylene triamine, triethylene tetramine, ethanol amine, propyl monoethanol amine, and dimethyl sulfoxide is added.

10. A fertilizer pile comprising a fertilizer or a fertilizing substance and pullulan or a derivative thereof.

11. The fertilizer pile of claim 10, wherein the derivative of pullulan is an etherized pullulan, an esterified pullulan or a pullulan-vinyl monomer graft polymer.

12. The fertilizer pile of claim 10, wherein the molecular weight of pullulan is 10,000 to 5,000,000.

13. The fertilizer pile of claim 10, wherein the fertilizing substance is oil meals, peat moss or compost.

14. The fertilizer pile of claim 10, wherein the amount of pullulan or derivative thereof is 0.01 to 50 parts by weight for 100 parts by weight of fertilizer or fertilizing substance.

15. The fertilizer pile of claim 10, wherein as an inorganic filler at least one member selected from the group consisting of calcium carbonate, calcium sulfite, calcium sulfate, aluminum hydroxide, talc and clay is added.

16. The fertilizer pile of claim 15, wherein the amount of the inorganic filler is 1 to 40 parts by weight for 100 parts by weight of the fertilizer or fertilizing substance.

17. The fertilizer pile of claim 15, wherein the average particle diameter of the inorganic filler is 50 microns or less.

18. The fertilizer pile of claim 10, wherein as a plasticizer at least one member selected from the group consisting of water, glycerol, ethylene glycol, propylene glycol, formamide, dimethyl formamide, diethylene triamine, triethylene tetramine, ethanol amine, propyl monoethanol amine, and dimethyl sulfoxide is added.

19. A process for producing a fertilizer composition which comprises mixing a fertilizer or a fertilizing substance and pullulan or a derivative thereof and granulating or compression-molding the resulting mixture.

20. A process according to claim 19, wherein the derivative of pullulan is an etherized pullulan, an esterified pullulan or a pullulan-vinyl monomer graft polymer.

21. A process according to claim 19, wherein the molecular weight of pullulan is 10,000 to 5,000,000.

22. A process according to claim 19, wherein the fertilizing substance is oil meals, peat moss or compost.

23. A process according to claim 19, wherein the amount of pullulan or derivative thereof is 0.01 to 50 parts by weight for 100 parts by weight of fertilizer or fertilizing substance.

24. A process according to claim 19, wherein as a plasticizer at least one member selected from the group consisting of water, glycerin, ethylene glycol, propylene glycol, formamide, dimethyl formamide, diethylene triamine, triethylene tetramine, ethanol amine, propyl monoethanol amine, and dimethyl sulfoxide is added.

25. A process for producing a fertilizer pile, which comprises mixing a fertilizer or a fertilizing substance and pullulan or a derivative thereof and extruding them through a die of an extruder at a temperature higher than that at which pullulan becomes plastic but lower than the decomposition temperature of the fertilizer.

26. A process according to claim 25, wherein the temperature is 30° C to 150° C.

27. A process according to claim 25, wherein the derivative of pullulan is an etherized pullulan, an esterified pullulan or a pullulan-vinyl monomer graft polymer.

28. A process according to claim 25, wherein the molecular weight of the pullulan is 10,000 to 5,000,000.

29. A process according to claim 25, wherein the fertilizing substance is oil meals, peat moss or compost.

30. A process according to claim 25, wherein the amount of pullulan or derivative thereof is 0.01 to 50 parts by weight for 100 parts by weight of fertilizer or fertilizing substance.

31. A process according to claim 25, wherein as an inorganic filler at least one member selected from the group consisting of calcium carbonate, calcium sulfite, calcium sulfate, aluminum hydroxide, talc and clay is added.

32. A process according to claim 31, wherein the amount of the inorganic filler is 1 to 40 parts by weight for 100 parts by weight of the fertilizer or fertilizing substance.

33. A process according to claim 31, wherein the average particle diameter of the inorganic filler is 50 microns or less.

34. A process according to claim 25, wherein as a plasticizer at least one member selected from the group consisting of water, glycerol, ethylene glycol, propylene glycol, formamide, dimethyl formamide, diethylene triamine, triethylene tetramine, ethanol amine, propyl monoethanol amine, and dimethyl sulfoxide is added.

* * * * *